United States Patent [19]

Whyte

[11] 3,942,170
[45] Mar. 2, 1976

[54] DISTRIBUTION NETWORK POWERLINE CARRIER COMMUNICATION SYSTEM

[75] Inventor: Ian A. Whyte, Pittsburgh, Pa.

[73] Assignee: Westinghouse Electric Corporation, Pittsburgh, Pa.

[22] Filed: Jan. 31, 1975

[21] Appl. No.: 546,068

[52] U.S. Cl............ 340/310 A; 340/151; 340/310 R
[51] Int. Cl.².................................... H04M 11/04
[58] Field of Search............ 340/310 A, 310 R, 151

[56] References Cited
UNITED STATES PATENTS

| | | | |
|---|---|---|---|
| 3,693,155 | 9/1972 | Crafton............................ | 340/310 R |
| 3,876,984 | 4/1975 | Chertok............................... | 340/151 |

*Primary Examiner*—Thomas B. Habecker
*Attorney, Agent, or Firm*—D. R. Lackey

[57] ABSTRACT

A distribution powerline carrier communication system for providing distribution automation functions. The communication system includes a distribution powerline, with inductive couplers and frequency translating repeaters cooperating to circumvent signal obstructions, such as distribution transformers, and to increase the signal strength. The inductive couplers pick up the communication signals without metallic contact to the primary distribution lines, and the repeaters change the frequency band of the communication signals, enabling the amplifier gain of the repeaters to be selected without limitation due to undesirable feedback and oscillation.

17 Claims, 4 Drawing Figures

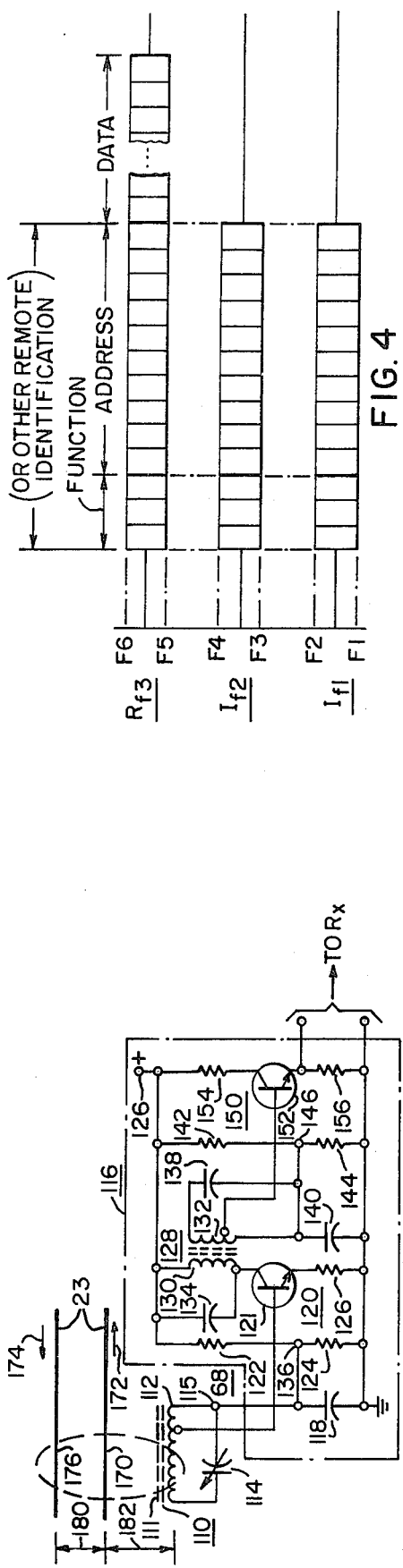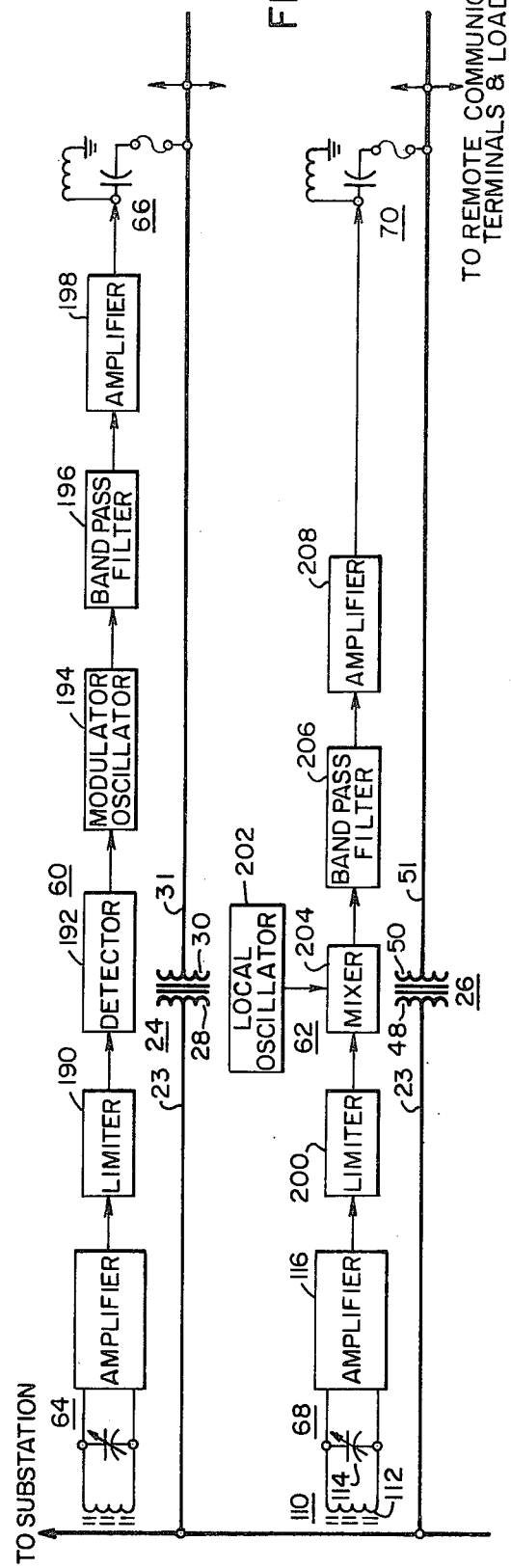

DISTRIBUTION NETWORK POWERLINE CARRIER COMMUNICATION SYSTEM

BACKGROUND OF THE INVENTION

1. Field of the Invention

The invention relates in general to powerline carrier communication systems, and more specifically to powerline carrier systems for performing distribution automation functions such as the automatic reading of utility meters, and selective load control.

2. Description of the Prior Art

The electrical utilities have used their transmission powerlines for many years for communication with remote switching and substation sites, for supervisory control purposes. The transmission lines are ideal for communication as they extend from the power generation site to the switching and substation sites without intervening obstacles to communication frequencies.

Communication over the distribution powerlines is much more difficult, and thus it is not a commonly used mode of communication for the electrical utilities. The distribution powerlines are susceptible to electrical noise and interference, and they have large numbers of distribution transformers, electrical loads, sectionalizing switches, capacitor banks, and the like, all of which provide some degree of attenuation for communication frequencies.

It is becoming increasingly more important to selectively and remotely control electrical loads, in order to reduce the magnitude of power demand peaks. Also, the availability of low cost non-volatile encoders due to the advances in large scale integration has made the automatic reading of utility meters attractive. Selective load control, automatic meter reading, and other distribution automation functions require some form of communication. Since the electrical utilities already have distribution powerlines which extend to each site to be communicated with, it would be desirable to use distribution powerline carrier for the communication mode, if the problems associated therewith can be economically dealt with.

U.S. Pat. Nos. 3,656,112; 3,702,460 and 3,815,119, all disclose some form of communication via the distribution network of an electrical utility. U.S. Pat. No. 3,656,112 discloses a communication system which uses a combination of electrical powerline and wireless. The wireless link is used to by pass distribution transformers and other obstructions located in the transmission path. U.S. Pat. No. 3,702,460 discloses making the neutral conductor of the distribution powerline available as a communication link by inserting a parallel resonant circuit between the neutral and ground, at each ground point in the system. The neutral-ground communication circuit bypasses distribution transformers. U.S. Pat. No. 3,815,119 uses the powerline conductor on the secondary side of a distribution transformer to transfer the various meter readings associated with the secondary to a common receiver point, where the readings are stored until they can be read, such as by a mobile unit which periodically travels near the receiver site and interrogates the site by a wireless link.

My co-pending application Ser. No. 425,759, filed Dec. 18, 1973, entitled "A Distribution Network Powerline Carrier Communication System", which is assigned to the same assignee as the present application, sets forth a new and improved arrangement for communicating over distribution powerlines. In this co-pending application, a substation area is divided into zones, and the zones, when interrogated by signals from an interrogation source, respond at different frequencies. Frequency changing or translating repeaters interface the zones to maintain zone isolation while boosting the strength of the signals within the zone. This multi-frequency arrangement reduces the possibility of a response signal acting as an interrogation signal.

The present application is an improvement upon the communication system of my hereinbefore mentioned co-pending application, with the improvement allowing obstructions, such as distribution transformers, to be easily circumvented without direct metallic connection with the high voltage primary side of the transformer.

SUMMARY OF THE INVENTION

Briefly, the present invention is a new and improved distribution powerline carrier communication system which utilizes magnetic field or inductive couplers and frequency translating or changing repeaters for increasing signal strength and circumventing signal obstructions, such as distribution transformers. The only metallic contact to the high voltage primary side of the distribution network is the interrogation signal insertion point at a substation. All interrogation signals are transferred from the primary side of the distribution network to the secondary side, circumventing each distribution transformer, via the inductive coupler and a frequency changing repeater. The response signal is picked up from the primary side of the distribution network via an inductive coupler.

The inductive coupler for picking up communication signals from the primary side of the distribution network substantially reduces installation time and cost, compared with a metallic contact capacitive type coupler. The inductive coupler may be used with any primary voltage distribution level, and thus need not be changed in the event the primary distribution voltage level is changed. Further, the inductive coupler does not have to be insulated to withstand the primary distribution voltage to ground, and thus its manufacturing cost is very low, compared with the direct contact, capacitive coupler.

The frequency changing repeater enables the signal picked up by the magnetic field coupler to be amplified without limiting the gain due to feedback. Thus, the signal strength at the remotely located receivers may be made high enough such that sensitive and therefore high cost receivers are not required.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 2 is a schematic diagram of a magnetic field coupler which may be used in the distribution powerline carrier system system shown in FIG. 1;

FIG. 3 is a partially block and partially schematic diagram of frequency changing repeaters which may be used in the distribution powerline carrier system shown in FIG. 1, and FIG. 4 is a graph which illustrates suitable formats for the interrogation and response signals, as well as indicating that the signals are in non-overlapping frequency bands.

DESCRIPTION OF THE PREFERRED EMBODIMENTS

Figure 1:
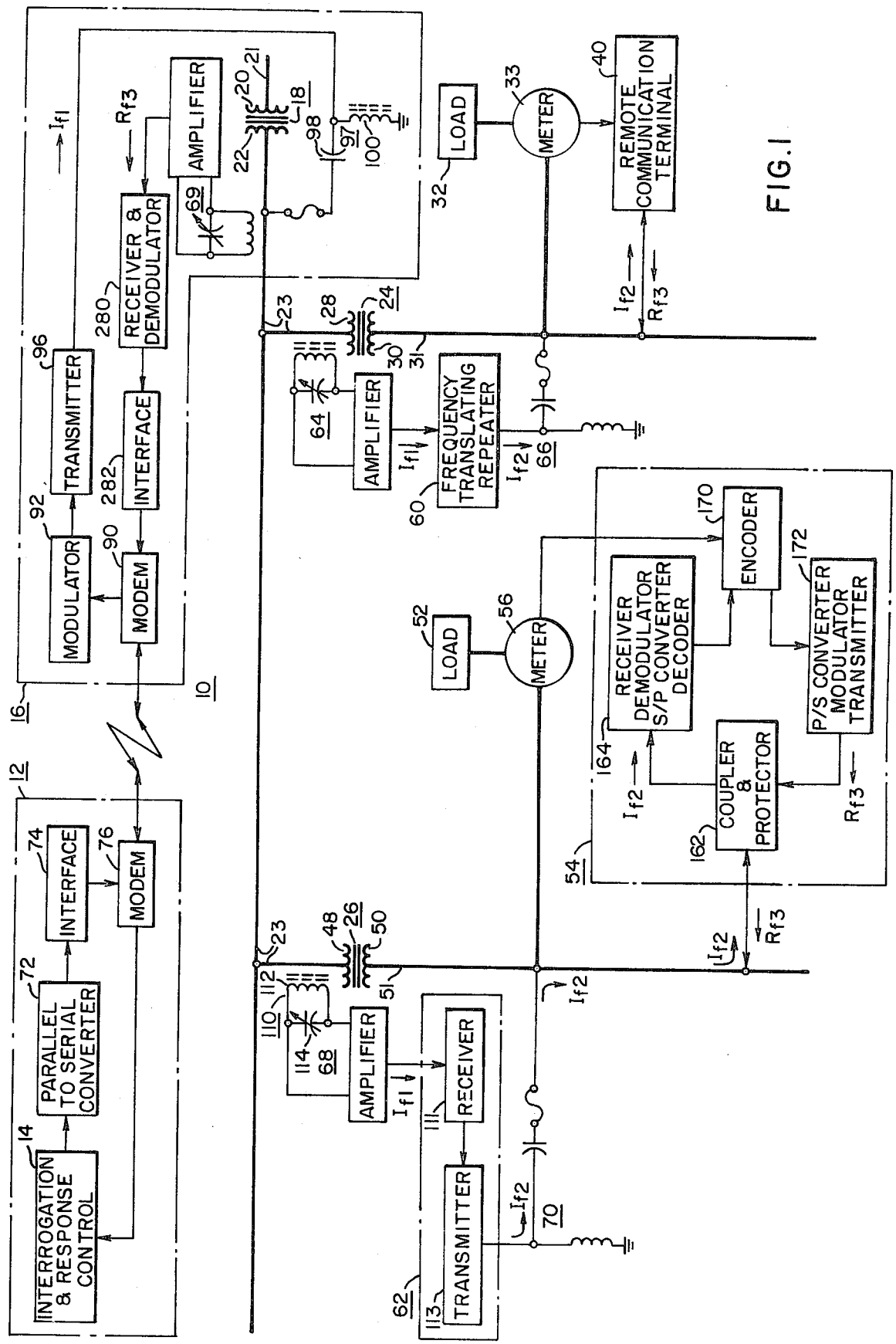
FIG. 1 is a partially block and partially schematic diagram of a distribution powerline carrier communication system constructed according to the teachings of the invention, utilizing magnetic field couplers and frequency changing repeaters.

In order to reduce the length and complexity of the present application, the following applications and U.S. Patents, all of which are assigned to the same assignee of the present application, are hereby incorporated into this application by reference.

1. Application Ser. No. 425,759 filed Dec. 18, 1973 in the name of I. A. Whyte, entitled "A Distribution Network Powerline Carrier Communication System"; and now abandoned 2. Application Ser. No. 444,587, filed Feb. 21, 1974 in the names of I. A. Whyte and L. C. Vercellotti, entitled "A Powerline Communication System Having A Protective Terminating Impedance Arrangement";

3. Application Ser. No. 546,069 filed Jan. 31, 1975 in the names of I. A. Whyte, L. G. Ottobre, and J. P. McGivern, entitled "A Distribution Network Powerline Carrier Communication System".

4. U.S. Pat. No. 3,820,073 issued June 25, 1974 in the names of L. C. Vercellotti, J. S. Britton, L. G. Ottobre, and J. R. Cricchi, entitled "Solid State Remote Meter Reading System Having Non-Volatile Data Accumulation".

Referring now to the drawings, and FIG. 1 in particular, there is shown a block diagram of a new and improved distribution powerline carrier communication system 10 constructed according to the teachings of the invention. The distribution Powerline carrier communication system 10 includes a source 12 of interrogation signals. Source 12 includes interrogation and response control 14, such as a digital computer located at the main control location, such as the central business office of an electrical utility. The computer may be programmed, for example, to interrogate remote communication terminals associated with loads connected to the distribution powerlines of the electrical utility, to obtain data relative to the readings of utility meters, such as electrical, gas and water meters, and/or it may request a performance of other functions such as controlling noncritical loads. Electrical loads, such as electrically operated hot water heaters may be selectively turned off and enabled, in order to provide a more constant overall demand for electrical power. Load continuity checks and service disconnect functions may also be provided.

The interrogation signals which are prepared by control 14 are sent by any conventional means to a selected distribution substation. Each of the substations to be communicated with includes a central communication terminal for receiving interrogation signals from, and for sending response signals to, the source 12 of interrogation signals located at the central or main control location. For purposes of example, FIG. 1 illustrates a single central communication terminal/distribution substation combination 16, as each such combination would be of like construction.

A convenient medium for communicating between the source 12 at the main location and the plurality of distribution substations, is by telephone. The address of each distribution substation would be a telephone number, with the interrogation and response control 14 gaining access to a selected substation by automatically dialing its number. In like manner, when a communication terminal at a substation has a response signal for source 12, it would gain access to the source 12 by automatically dialing the telephone number of the source. A telephone link is an economical and convenient method of communicating between source 12 and the plurality of substations, and for purposes of example it will be assumed that this portion of the interrogation and response communication link is the telephone. However, it is to be understood that this specific link may be wireless, such as radio or microwave, or any other suitable form of communication.

Each distribution substation includes one or more step-down power transformers, such as transformer 18, which includes primary windings 20 connected to the high voltage transmission lines 21, and secondary windings 22 connected to the primary distribution network. The primary distribution network will be referred to as the first distribution powerline conductors 23.

The primary distribution network voltage level is stepped down to the secondary voltage distribution level near the connected loads by a plurality of distribution transformers, such as distribution transformers 24 and 26. Distribution transformer 24 includes primary windings 28 connected to the first powerline conductors 23, and secondary windings 30 connected to a secondary distribution network 31 which will be referred to as the second distribution powerline conductors. Electrical loads, such as residential customers, are connected to the second powerline conductors 31, such as electrical load 32 which is connected to the second powerline conductors 31, via an electrical meter 33. Each electrical load has an addressable remote communication terminal associated therewith, with electrical load 32 having an addressable communication terminal 40. The remote communication terminals are each connected the second distribution powerline conductors 31.

In like manner, distribution transformer 26 includes primary windings 48 connected to the first powerline conductors 23, and secondary windings 50 connected to a secondary distribution network 51, which will be refferred to as the second distribution powerline conductors. Electrical loads, such as load 52, are connected to the powerline conductors 51. Electrical load 52 has an addressable remote communication terminal 54 associated therewith, which is connected to the second powerline conductors 51, such as for reading a meter 56 associated with the load 52, and/or for performing other distribution automation functions.

Each distribution transformer has a frequency translating repeater associated therewith, with repeaters 60 and 62 being associated with distribution transformers 24 and 26, respectively. The frequency translating repeaters are coupled to the powerline conductors with unidirectional couplers on the primary and secondary sides of a distribution transformer, with the unidirectional coupler on the primary side being an inductive or magnetic field coupler, and the unidirectional coupler on the secondary side being a capacitive type coupler which directly contacts one of the second distribution powerline conductors with a metallic contact. More specifically, distribution transformer 24 has a unidirectional coupler 64 magnetically coupled to one or more of the first distribution powerline conductor 23 and a unidirectional coupler 66 connected to one or more of the second powerline conductors 31. Distribution transformer 26 has a unidirectional coupler 68 magnetically coupled to one or more of the first powerline conductors 23, and a unidirectional coupler 70 connected to one or more of the second powerline conductors 51.

When observing the complete communication system from an interrogation and response signal viewpoint, the interrogation communication link includes the source 12 of interrogation signals, the communication link between the source 12 and the central communication terminal 16, such as a telephone link, the central communication terminal 16, the first powerline conductors 23, a plurality of unidirectional couplers, frequency translating repeaters, and unidirectional couplers, one for each distribution transformer, such as unidirectional coupler 64, frequency translating repeater 60, and unidirectional coupler 66, second powerline conductors, such as powerline conductors 31, and a plurality of addressable remote communication terminals associated with each second powerline conductor network, such as remote communication terminal 40. It will be noted that the distribution transformers are not part of the interrogation communication link.

A response communication link extends from each addressable remote communication terminal, such as remote terminal 40, over the second powerline conductors, such as conductors 31, through the associated distribution transformer from the secondary windings to the primary windings thereof, such as from the secondary windings 30 to the primary windings 28 of distribution transformer 24, over the first powerline conductors 23 to the central communication terminal 16 via a unidirectional magnetic field coupler 69 located at the substation, and then through the telephone link to the interrogation and response control 14 located at the central control location.

The disclosed arrangement provides an economical approach to the use of the distribution powerlines for communication purposes, while eliminating certain of the problems associated therewith. For example, if the interrogation communication signals were to be sent from the substation 16 to the remote communication terminals through the distribution transformers, from their primary to their secondary sides, the signal strengths at the remote communication terminals would be weak and unreliable, and even by supplying high cost, sensitive receivers at every remote communication terminal it would not insure that all interrogation signals would be properly received. On the other hand, by providing frequency translating repeaters at each distribution transformer, the desired system reliability is assured by providing strong interrogation signals at the remote communication terminals, signals which may be reliably received without the necessity of utilizing sensitive high cost receivers. The magnetic couplers on the primary side of the distribution transformers may be constructed at a very low cost, since they do not directly contact the high voltage primary distribution lines. The direct contact couplers on the low voltage or secondary side of the distribution transformers may be constructed at a relatively low cost, since the secondary distribution voltage to ground is normally only 120 or 240 volts. The receiver in the frequency translating repeater need not be highly sensitive, since it is picking up the interrogation signal before it is subjected to the attenuation of the associated distribution transformer.

When considering the response signal, the present invention takes advantage of the fact that while the attenuation impedance presented by a distribution transformer to a communication signal depends upon the specific design of the distribution transformer, the attenuation from the secondary to the primary side of a distribution transformer is usually only about one-half the attenuation from the primary to the secondary side. Thus, the signal strength of a response signal is not attenuated to the same extent as the interrogation signal, and since there is only one receiver at the substation, it more economical to provide a highly sensitive receiver at this location than to use a repeater for the response signal at each distribution transformer, which would also require a high cost direct contact capacitive type coupler connected to the primary side of the distribution network.

Returning now to the source 12 of interrogation signals, in addition to the digital computer for preparing the interrogation signal and receiving the response signal, indicated by the interrogation and response control 14, the central control location also provides a parallel to serial converter 72, which provides a base band binary signal in serial format, and this serial base band binary signal is applied to a data set interface 74, such as Texas Instruments SN75150, and then to a modem 76.

The interrogation and response control 14 prepares the interrogation signal in parallel form, which signal includes the address of the remote communication terminal which is to be accessed. A function identifier is also included in the interrogation signal when a plurality of automation functions are to be selectively performed.

The modem 76 establishes a telephone link with a modem 90 which is part of the central communication terminal located at the selected distribution substation. The serial base band binary signal is used to modulate a carrier in a modulator 92. The modulator 92 is preferably the form of modulation known at frequency shift keying, in which the modulating wave shifts the output frequency between predetermined values, but any suitable form of modulation may be used.

The output of the modulator 92 is amplified in a transmitter 96, providing an interrogation signal in a first frequency band, which signal will be referred to as $I_{f1}$. A suitable format for signal $I_{f1}$ is shown in FIG. 4, which illustrates that the carrier frequency is within a frequency band F1–F2, and is modulated by a base band binary signal which includes the unique address of the remote terminal to be accessed, and a function identifier, if more than one function may be selected. Signal $I_{f1}$ is coupled to one of the first powerline conductors 23 of the primary distribution network via a unidirectional coupler 97 which includes a 60 Hz blocking capacitor 98 and an autotransformer 100. The signal is usually coupled between one of the line conductors and the common neutral return or ground wire. The capacitor 98 and the autotransformer 100 are serially connected from one of the first powerline conductors 23 to ground, and the signal from the transmitter 96 is applied between the capacitor and autotransformer, or to a predetermined tap thereon, and ground. Instead of using an autotransformer, it would also be suitable to use a two winding matching transformer.

The modulated carrier is picked up by a unidirectional magnetic field coupler associated with each repeater; such as unidirectional couplers 64 and 68. The unidirectional couplers, as illustrated relative to coupler 68, each include a ferrite rod antenna 110 having a coil 112 tuned by a capacitor 114 to the frequency band of the interrogation signal $I_{f1}$, and an amplifier 116.

FIG. 2 is a schematic diagram of a magnetic field coupler which may be used for the couplers 64 and 68, as well as for the coupler 69, with the latter coupler being the coupler which accepts the response signal from the first powerline conductors 23. For purposes of example, it will be assumed that the magnetic field coupler shown in FIG. 2 is the magnetic field coupler 68 shown in FIG. 1.

Magnetic field coupler 68 includes an antenna 110 which may be similar to a ferrite rod radio antenna. Antenna 110 includes a ferrite rod 111 and a tapped coil 112, with the antenna 110 being tuned to the frequency band of the carrier signal $I_{f1}$ by a capacitor 114, which is connected across the ends of the coil 112. A ferrite rod having a length of about 100 mm and a diameter of about 13 mm, wrapped with about 200 turns of fine wire, tapped at about 20 turns, has been found to provide an excellent universal antenna. The junction 115 between capacitor 114 and one end of the coil 112 is connected to ground 116 via capacitor 118.

The tap on the coil 112, which is selected for impedance matching, is connected to a first transistor amplifier 120 which includes an NPN transistor 121. The coil tap is connected to the base of transistor 121. Amplifier 120 also includes a voltage divider having resistors 122 and 124 serially connected from a source of unidirectional potential, with the source being represented by terminal 126, to ground 116, a resistor 126 connected from the emitter of transistor 121 to ground 116, and an interstage coupling transformer 128 which includes a primary winding 130 connected from source 126 to the collector of transistor 121, and a tapped secondary winding 132. A capacitor 134 is connected across the primary winding 130. Capacitor 134 and coupling transformer 128 provide a band pass filter for the frequency band of the carrier signal $I_{f1}$. The junction 136 between resistors 122 and 124 is connected to junction 115.

The interstage band pass filter is completed on the secondary side of transformer 128 by capacitors 138 and 140 which are serially connected from one side of winding 132 to ground 116. A voltage divider which includes resistors 142 and 144 serially connected from source 126 to ground 116, has the junction 146 between the resistors connected to the junction between capacitors 138 and 140.

The tap on the secondary winding 132, which is selected for impedance matching, is connected to a second transistor amplifier, which includes an NPN transistor 152 and resistors 154 and 156. The tap on the secondary 132 is connected to the base of transistor 152, resistor 154 is connected from source 126 to the collector of transistor 152, and resistor 156 is connected from the emitter of transistor 152 to ground 116. Resistor 156 is a load resistor, with the signal for the receiver portion of repeater 62 being taken across resistor 156.

While the description of the magnetic field coupler states that it is tuned to the carrier frequency, it has been found that it may be beneficial to detune the magnetic field coupler, to a frequency slightly removed from the carrier frequency, especially when the primary distribution line is subject to relatively large amplitude transients. The detuning of the magnetic field coupler ensures that objectionable ringing or oscillation does not occur at the frequency of the interrogation signal.

A specific example of the use of the magnetic field coupler 68 in an overhead distribution network having a powerline communication system in which the carrier borne interrogation signal $I_{f1}$ is at a nominal frequency of 100 kHz, will now be described. The primary distribution line conductors 23 shown in FIG. 2 include a high voltage conductor 170 which is carrying an interrogation signal current, indicated by arrow 172, which is assumed to be 10 mA, RMS. A return signal, which is assumed to be 8 mA RMS, is indicated by arrow 174 in a common neutral or ground line 176. The difference current of 2 mA is assumed to return by other routes.

It is further assumed that the common neutral return or ground, line 176 is mounted directly above the high voltage line 170, with their spacing, indicated at 180, being one meter, and that the antenna 110 is spaced two meters below the high voltage line 160, as indicated by spacing 182.

With this geometry, the magnetic field intensity, H in mA per meter and the voltage in mV RMS developed across the coil 112 may be calculated. For example, the resulting magnetic field intensity $H_r$ due to the signal current in the high voltage and return lines is:

$$H_r = H_1 - H_2 = \frac{I_1}{2\pi R_1} - \frac{I_2}{2\pi R_2}$$

$$= \frac{1}{2\pi}\left(\frac{1}{2} - \frac{0.8}{4}\right) mA/meter,$$

$$= \frac{1}{2\pi}(0.3) \, mA/meter$$

The voltage developed across the terminals of an untuned, air core coil of "n" turns and having an area of A sq. meters is given by the expression:

$$E_T = BAn \, 2\pi f \text{ volts}$$

where $$B = \mu H$$

$$u = 4\pi \times 10^{-7}$$

$$f = 10^5 \, Hz$$

thus:

$$E_T = 1.1 \, mV \, RMS$$

With the coil 112 tuned by capacitor 114, and assuming a working Q of 20, the terminal voltage of the tuned circuit will be given by:

$$E_{TT} = Q_w \, E_T$$

$$= 22 \, mV \, RMS$$

In terms of receiver design, 20 mV RMS is a relatively large signal. Consequently, the filtering and limiting required, to remove the unwanted 60 Hz component, can be achieved with simple low cost circuits.

The frequency translating repeater 62 amplifies the 22 mV interrogation signal $I_{f1}$ while changing the frequency thereof, to provide an interrogation signal $I_{f2}$ which is in a frequency band which is non-overlapping with a frequency band of the signal $I_{f1}$. An output signal of only 1 volt RMS has been found to be sufficient, even over long secondary lines, to provide a signal of 100 mV RMS at the remote communication terminals. This relatively large interrogation signal, available at the remote communication terminals, permits simple and low cost receivers to be used.

The amplified interrogation signal $I_{f1}$ provided by each of the unidirectional couplers is applied to its associated frequency translating repeater, such as repeaters 60 and 62. Since each of the repeaters are of like construction, only repeater 62 will be described in detail.

Repeater 62 includes a receiver 111, which may be conventional, typically including a limiter for removing noise from and amplifying the carrier signal $I_{f1}$, and a demodulator circuit for producing the base band logic signal. The output of receiver 111 is applied to a frequency translating, amplifying transmitter 113 which provides a modulated carrier interrogation signal $I_{f2}$. The output of the transmitter 113 is applied to the second powerline conductors 51 via the unidirectional coupler 70. As illustrated in FIG. 4, the frequency band F3–F4 occupied by the interrogation signal $I_{f2}$ provided by the transmitter 113 is non-overlapping with the frequency band F1–F2 of the signal $I_{f1}$ received by the receiver 111. The change in frequency prevents the transmitted signal $I_{f2}$ from feeding back through the transformer 26 and acting as an input to receiver 111, and thus the gain of the transmitter 113 may be selected without limitation due to feedback and oscillation problems.

FIG. 3 illustrates repeaters 60 and 62 in greater detail, with each being illustrated with slightly different arrangements in order to set forth two suitable types of frequency changing repeaters which may be used. Repeater 60 includes a limiter 190, which reduces distortion and noise in the received interrogation signal $I_{f1}$, and the interrogation signal is then applied to a detector 192 which demodulates the signal and processes it to recondition and reconstitute the original base band binary logic information prepared by the interrogation and response control 14. This base band logic signal is then applied to a modulator and oscillator circuit 194, in which the base band signal is used as a modulator wave for modulating a transmitter frequency which is in a frequency band outside of the frequency band of the received signal $I_{f1}$. The modulated transmitter carrier signal is passed through a band pass filter 196 tuned to the frequency band of the carrier signal, and the resulting signal, referred to as signal $I_{f2}$, is amplified in an amplifier 198 and applied to the second powerline conductors 31 via capacitive coupler 66. The modulation may be of the frequency shift key type (FSK); or, any other suitable type of frequency or phase modulation may be used.

Repeater 62 is illustrated as being of the type which changes the interrogation signal to a new frequency band by the heterodyne action. For example, the signals from the magnetic field coupler 68 may be applied to a limiter 200, and then mixed with a signal from a local oscillator 202 in a mixer 204. The output of the mixer 204 is applied to band pass filter 206 to select the desired sum and/or difference frequency such that the interrogation signal is in a frequency band $F_3$ to $F_4$, which is non-overlapping with the frequency band $F_1$ to $F_2$ of the original interrogation signal $I_{f1}$. The signal $I_{f2}$ from the band pass filter 206 is amplified in an amplifier 208 and applied to the secondary distribution powerline conductor 51 via capacitive coupler 70.

Remote communication terminal 54 includes a bidirectional coupler and protector 162 connected to one or more of the second powerline conductors 51. A suitable coupler for remote communication terminals is disclosed in the hereinbefore mentioned co-pending application Ser. No. 444,587. The interrogation signal $I_{f2}$ picked up by the coupler 162 is applied to the receiver. The receiver demodulates the signal and applies it to a serial parallel converter and decoder circuit, such as described in the hereinbefore mentioned co-pending application Ser. No. 546,069. If the interrogation signal received is addressed to this remote communication terminal, as noted in a suitable comparator, the function identifier is decoded and the requested function is performed. The receiver, demodulator, serial to parallel converter, comparator, and decoding functions are illustrated generally at 164. Functions such as the reading of utility meters and controlling the on and off times of electrical loads may be performed. If the requested function is to read a meter, such as an electric, gas or water meter, an encoder 170 is enabled which applies the meter reading data, such as provided by meter 56, to a parallel to serial converter, modulator, and an amplifying transmitter, all shown generally at 172. The serialized response signal, which is referred to as $R_{f3}$, from the transmitter portion of the function shown at block 172, which signal occupies a frequency band $F_5$–$F_6$ which is non-overlapping with the frequency bands of signals $I_{f1}$ and $I_{f2}$, is applied to the coupler and protector 162, which in turn places the response signal $R_{f3}$ on one of the second powerline conductors 51. FIG. 4 illustrates a suitable format for signal $R_{f3}$. The signal contains any data to be sent back to the interrogation source, such as a meter reading, as well as some identification as to source of the response signal. For purposes of example, the identification is indicated as being the unique address used in the interrogation signal, but any suitable identifying signal may be used. The encoder 170 may be of the type described in the hereinbefore mentioned U.S. Pat. No. 3,820,073 entitled "Solid State Remove Meter Reading System Having Non-Volatile Data Accumulation"; or, any other suitable encoder may be used.

The response signal $R_{f3}$ which is applied to the second powerline conductors 51, via the coupler 162 proceeds through the distribution transformer 26 to the first powerline conductors 23. The response signal $R_{f3}$ is picked up from the powerline conductors 23 by the unidirectional coupler 69 and applied to a receiver and demodulator circuit 280. The receiver 280 demodulates the response signal and applies it to a data set interface 282, which is similar to the data set interface 74. Modem 90 sends the signal to the central control station over the communication link, where it is received by modem 76 and applied to the interrogation and response control 14. This completes the interrogation and response cycle initiated by the interrogation signal $I_{f1}$ prepared by the control 14.

In summary, there has been disclosed a new and improved distribution network powerline communication system which circumvents distribution transformers in the interrogation communication link by a combination of magnetic field couplers and frequency changing repeaters. This combination provides a relatively simple and low cost means for communicating past obstructions such as distribution transformers, voltage regulators and the like, and provides other advantages such as making it possible to provide the desired amplifier gain, since the output frequency from a repeater is different than its input frequency. Thus, oscillation due to feedback is not a problem. Further, there is no need for an expensive high voltage coupling capacitor, since the interrogation signal is picked up from the high voltage primary side of the distribution network with a magnetic field coupler, which is not directly connected to the powerline. Since the coupler is not directly connected to the powerline, installation is inexpensive and fast, and the couplers are universal, making it unnecessary to change them in the event the primary distribution voltage level is changed. The fact that the output level of the transmitter section of the repeater may be made reasonably high, allows relatively low gain and therefore inexpensive receivers to be used at the remote communication terminals. The output impedance of the transmitter section of the frequency changing repeater may be made sufficiently low, so that matching of the transmitter to the secondary distribution network is not critical. Therefore, the transmitter voltage is relatively independent of the secondary line impedance. Also, the invention discloses the use of a magnetic field coupler at the substation receiver, which allows a single matching transformer to be used to couple the substation transmitter to the primary distribution line.

I claim as my invention:

1. A powerline communication system, comprising:
   frequency translating repeater means,
   uniquely addressable remote communication terminals,
   means providing an interrogation signal in a first frequency band which includes an address of a selected remote communication terminal,
   a first communication link including powerline conductors and magnetic field coupler means interconnecting said means which provides said interrogation signal and said repeater means,
   a second communication link including powerline conductors interconnecting each repeater means with certain of said remote communication terminals,
   each of said repeater means including means for changing the frequency of said interrogation signal to a second frequency band which is non-overlapping with said first frequency band, and means for applying the resulting interrogation signal to its associated second communication link,
   each of said remote communication terminals, when uniquely addressed by an interrogation signal over its associated second communication link, providing a response signal on said second communication link, with said response signal being in a third frequency band which is non-overlapping with the first and second frequency bands,
   and response receiving means associated with said first communication link for receiving the response signal provided by an addressed remote communication terminal.

2. The powerline communication system of claim 1 including a utility meter associated with each remote communication terminal, and encoder means for translating the reading of said utility meter to a signal which is incorporated into the response signal provided by the remote communication terminal when it is uniquely addressed by an interrogation signal.

3. The powerline communication system of claim 1 wherein the responding remote communication terminal adds its unique address to the response signal.

4. The powerline communication system of claim 1 including a distribution transformer associated with each frequency translating means, with each distribution transformer interconnecting a powerline conductor of the first communication link with a powerline conductor of a second communication link.

5. The powerline communication system of claim 4 wherein each frequency translating repeater means receives the interrogation signal from the first communication link and applies the modified interrogation signal to a second communication link, by-passing the associated distribution transformer.

6. A powerline communication system, comprising:
   first powerline conductor means,
   second powerline conductor means,
   distribution transformer means interconnecting said first and second powerline conductor means,
   electrical loads connected to said second powerline conductor means,
   frequency translating repeater means associated with certain of said distribution transformer means,
   uniquely addressable remote communication terminals associated with certain of said electrical loads,
   a source of interrogation signals which provides an interrogation signal in a first frequency band having an address of a selected remote communication terminal,
   response receiving means,
   means providing an interrogation communication link between said source of interrogation signals and said remote communication terminals, including said primary electrical distribution powerline conductor means, magnetic field coupling means coupling said first powerline conductor means to said repeater means, coupling means coupling said repeater means to said second powerline conductor means, and means coupling each remote communication terminal to said second powerline conductor means, whereby said repeater means changes the frequency band of the interrogation signal applied to the second powerline conductor means to a second band which is non-overlapping with the first band,
   means providing a response communication link between said remote communication terminal and said response receiving means, including said second powerline conductor means, said distribution transformer means, said first powerline conductor means, and means coupling said response receiving means to said first powerline conductor means, whereby each remote communication terminal provides a response signal for said response receiving means when it is addressed by an interrogation signal with said response signal being in a third frequency band, which is non-overlapping with said first and second frequency bands.

7. The powerline communication system of claim 6 including a utility meter associated with each remote communication terminal, and encoder means for translating the reading of said utility meter to a signal which is incorporated in the response signal provided by the remote communication terminal when it is uniquely addressed by the interrogation signal.

8. The powerline communication system of claim 6 wherein the responding remote communication terminal adds its unique address to the response signal.

9. A powerline communication system for transmitting carrier signals over first and second distribution network powerline conductor means connected between a distribution network substation and a plurality of distribution transformers, and between the distribution transformers and a plurality of electrical loads, respectively, comprising:
frequency translating repeater means at certain of the distribution transformers,
first and second coupling means coupling each of said repeater means to the first and second powerline conductor means, respectively, connected to the associated distribution transformer, with said first coupling means being a magnetic field coupler,
uniquely addressable remote communication terminals at certain of the electrical loads,
means coupling each of said remote communication terminals to the second powerline conductor means connected to the associated electrical load,
means providing an interrogation signal which includes an address for addressing a selected remote communication terminal,
a central communication terminal at the substation providing a first modulated carrier signal on the first powerline conductor means responsive to said interrogation signal, which is in a first frequency band,
said repeater means each including means for receiving said first modulated carrier signal, and for transmitting a second modulated carrier signal responsive to said modified interrogation signal over the second powerline conductor means it is coupled to, which is in a second frequency band, non-overlapping with said first frequency band,
said remote communication terminals each including means for receiving and processing the second modulated carrier signal, and when uniquely addressed by the second modulated carrier signal providing a response signal on the associated second powerline conductor means which is in a third frequency band, non-overlapping with said first and second frequency bands,
and coupling means coupled to the first powerline conductor means for receiving the response signal.

10. The powerline communication system of claim 9 including a utility meter associated with each remote communication terminal, and encoder means for translating the reading of said utility meter to a signal which is incorporated into the response signal provided by the remote communication terminal when it is uniquely addressed by the second modulated carrier signal.

11. A distribution network powerline carrier communication system for automatically and remotely reading a utility meter, comprising:
a distribution substation,
a plurality of distribution transformers,
a plurality of electrical loads,
first powerline conductors interconnecting said distribution substation with said plurality of distribution transformers,
second powerline conductors interconnecting each of said distribution transformers with certain of said electrical loads,
utility meter means associated with certain of said electrical loads,
encoder means for coverting the reading of said utility meter means to an electrical signal,
frequency translating repeater means associated with certain of said distribution transformers,
addressable remote communication terminal means associated with certain of said electrical loads, for providing a response signal when addressed which includes the signal from an associated encoder means,
a central communication terminal including means for providing an interrogation signal in a first frequency band which includes the address of a selected remote terminal means, and means for receiving signals from said remote communication terminal means,
means providing an interrogation communication link, including said first powerline conductors, a magnetic field coupler coupling said first powerline conductors to said repeater, means coupling said repeater to said second powerline conductors, and means coupling said second powerline conductors to said remote communication terminal means,
said repeater means, when receiving an interrogation signal, providing a modified interrogation signal for its associated remote communication terminals which is in a second frequency band, non-overlapping with said first frequency band,
said remote communication terminal, when uniquely addressed by the modified interrogation signal providing a response signal which includes a signal provided by its associated encoder means, with said response signal being in a third frequency band, non-overlapping with said first and second frequency bands,
and means providing a response communication link which extends from each remote communication terminal means to the central communication terminal, via its associated distribution transformer means.

12. A powerline communication system, comprising:
first and second powerline conductor means,
impedance means associated with said first and second powerline conductor means,
first communication terminal means providing a first communication signal on said first powerline conductor means which has a carrier frequency within a first frequency band,
repeater means,
first coupling means, said first coupling means inductively coupling the first communication signal from said first powerline conductor means into said repeater means,
said repeater means including means for modifying said first communication signal by changing the carrier frequency such that it is within a second frequency band, which is non-overlapping with said first frequency band,
second coupling means applying the modified first communication signal to said second conductor means,
and second communication terminal means associated with said conductor means for receiving the modified first communication signal.

13. The powerline communication system of claim 12 wherein the repeater means includes means for amplifying the modified first communication signal.

14. The powerline communication system of claim 12 wherein the second communication terminal means includes means providing a second communication signal and means for applying said second communication signal to the second powerline conductor means, said second communication signal having a carrier frequency within a third frequency band which is non-overlapping with the first and second frequency bands, and the first communication terminal means includes means for receiving the second communication signal over the first and second conductors.

15. The powerline communication system of claim 12 wherein the impedance means is a transformer which interconnects the first and second powerline conductors, with the repeater means providing a unidirectional by-pass circuit about said transformer for communication signals.

16. The powerline communication system of claim 15 wherein the second communication terminal means includes means providing a second communication signal and means for applying it to the second powerline conductor means, said second communication signal having a carrier frequency within a third frequency band which is non-overlapping with the first and second frequency bands, and the first communication terminal means includes means for receiving the second communication signal.

17. The powerline communication system of claim 12 wherein the first coupling means is a magnetic field coupler including a ferrite rod antenna disposed in the magnetic field adjacent the first conductor means, a band pass filter tuned to the first frequency band, and an amplifier.

* * * * *